United States Patent Office 3,529,991
Patented Sept. 22, 1970

3,529,991
BORATE AND METAL SALT COATED GLASSWARE AND METHOD OF MAKING
Francis J. Shonebarger and Charles G. Allen, Lancaster, Ohio, assignors to Anchor Hocking Corporation, Lancaster, Ohio, a corporation of Delaware
No Drawing. Filed June 16, 1967, Ser. No. 646,470
Int. Cl. C03c 17/22, 17/32
U.S. Cl. 117—72           7 Claims

ABSTRACT OF THE DISCLOSURE

An improved protective coating for glass articles such as containers, tumblers, tableware and the like which is applied as a water spray to the hot surfaces of the glass articles after their formation. The coating protects the glass articles against damage by providing a scratch resistant and lubricating surface and it also is useful as an undercoat for secondary polyethylene and other lubricative coatings. The coating formulation comprises a water solution of a source of boron such as boric acid with an additional compound for providing a source of metal ions such as aluminum, zinc or magnesium compounds. The coating is applied to hot glass surfaces as a spray or otherwise and the coating reacts on the hot surfaces to form what are believed to be highly polar complexes containing $BO_3^{-3}$ groups.

BACKGROUND OF THE INVENTION

The present invention relates to the treatment of surfaces of glassware such as containers or tumblers and the like and particualrly to the treatment of the outer surfaces of such articles which may be subjected to an abrasive contact with similar articles or with filling, labeling, sealing, decorating or other equipment after the glass articles are formed.

Protective coatings of this general type are known which are applied by vapor deposition processes or by water spray processes and these prior coatings such as the coating including titanium as described in the U.S. Pat. No. 2,478,817 have been successfully used for providing some degree of increased scratch resistance for glass articles.

The present coating formulation, however, is the result of a need for such a protective coating which is easily applied as a direct water base spray and which in addition to being easily applied without the formation of objectionable fumes or vapors provides desirable color, lubricity, scratch resistance, luster and other properties such as stability at high temperature after application.

The boron containing water solutions described herein provide such improved results and particularly where the source of boron such as boric acid is combined in the water solution with certain metal compounds which cooperate in a synergistic manner in greatly increasing the desirable coating properties noted above. The boron in the preferred coating formulations is believed to form a coating on the hot glass surfaces including highly polar complexes containing $BO_3$ groups. The addition of the metal compounds as sources of certain metallic ions in the formulation is believed to usefully modify these $BO_3^{-3}$ groups to significantly increase the bond between the glass surface and the coating as well as forming a better bond with secondary coatings.

Accordingly an object of the present invention is to provide improved protective coating for glass articles.

Another object of the present invention is to provide an improved protective coating for application as a water surface spray for glass articles.

Another object of the present invention is an improved protective coating comprising $BO_3^{-3}$ groups.

Another object of the present invention is to provide a protective coating for increasing the scratch resistance of glass articles.

Another object of the present invention is to provide a protective coating for glass articles combining high scratch resistance with good lubricity.

Another object of the present invention is to provide a protective coating for glassware combining good lubricity and high scratch resistance with acceptable color and luster.

Other and further objects of the invention will be obvious upon an understanding of the illustrative embodiment about to be described or will be indicated in the appended claims, and various advantages not referred to herein will occur to one skilled in the art upon employment of the invention in practice.

DESCRIPTION OF PREFERRED EMBODIMENTS

A preferred embodiment of the coating formulation basically comprises a water solution containing a source of boron such as boric acid and an additional compound providing a source of metal ions is preferably included in the formulation as it has been found to result in significant increases in both the lubricity and scratch resistance exhibited by the completed coating.

While improvements in the lubricity of glass surfaces have been found to be obtained with water solutions containing boric acid by itself, these solutions exhibit a tackiness during application to the glass surfaces which is objectionable in certain article handling operations. This objectionable characteristic has been found to be minimized with the combinations of boric acid and metal compounds described below and in addition significant increases in the protective properties have been obtained as indicated with the use of the added metal compounds in the preferred formulations.

One preferred formulation which has been found to combine all of the various desirable properties as discussed above is an aqueous solution of boric acid and aluminum sulphate in the proportions of about 5 grams of $H_3BO_3$ and about 5 grams of $Al_2(SO_4)_3 \cdot 18H_2O$ to 100 cc.'s of water. The above ingredients may be mixed at normal room temperatures or with the water having its temperature slightly elevated by a few degrees. The mixed formulation then is ready to be sprayed directly onto the hot surfaces of the glassware. The hot surfaces of the glassware are at an elevated temperature between the strain temperature and the deforming temperature of the glassware. A convenient arrangement for applying the spray is to direct it onto the glassware after the glassware has been formed and while the glassware retains sufficient heat from the forming process to be at the desired coating temperature of about 1050° F. The spray is directed over the desired surfaces of the glassware by any suitable spraying or atomizing means such as the regular industrial atomizing or air spray guns. The time during which the glass surface is exposed to the spray is adjusted to assure complete coverage of the surface with the aqueous solution and the distance that the spray nozzles are positioned from the surfaces are similarly set to assure a full covering film in the time during which the hot glass article is exposed to the spray pattern. Since only a continuous thin covering layer of the aqueous solution is required on the glassware the spraying operations are conveniently carried out by spray nozzles positioned on convenient mountings adjacent to the regular glassware lehr belt or a similar conveyor so that the articles may be sprayed as they move from the forming apparatus and past the nozzles at their normal handling speeds.

The above described formulation includes the indicated source of aluminum atoms to obtain the improved results discussed above. It is believed that highly polar $BAlO_3$ complexes are formed on the glass surfaces which act as many small magnets to bond the polar molecules of outer coatings such as polyethylene to the glass surface.

A convenient means for determining relative lubricity values and for comparing them with the lubricity of raw glass consists of a physical measuring device which simulates glass article contact between predetermined areas of glass and which gives a number proportional to the contacting friction forces experienced between the glass samples. This provides a direct comparison between similarly tested samples with coatings to be compared. The lower the lubricity reading or index which is obtained, the better the resultant film is from this standpoint. Table I below gives the lubricity readings as obtained with the above described preferred coating and as contrasted with corresponding lubricity readings on the same index for raw glass and other coatings. The range of lubricities shown on the chart is seen to be at least twice that of the raw glass for all of the formulations listed.

Another characteristic of the coatings which is significant is the film strength of the coating. This is determined by measuring the pressure indicated as an index reading in pounds required to form scratches when two glass surfaces of predetermined area are rubbed together. The film strength index gives a direct comparison of film strength values for similar samples with the protective values of the coatings being proportional to the reading and improving as the index increases. In Table I below the corresponding film strengths obtained with the preferred coating formulations are compared with other coatings and with raw glass.

TABLE I

| Coatings tested | Lubricity index | Film strength index |
|---|---|---|
| (1) Raw glass surface | .806 | 1 |
| (2) Boron coating (boric acid plus aluminum sulphate) | .375 | 5 |
| (3) Polyethylene | .232 | 4 |
| (4) Polyethylene after retorting at 250° F. for 40 minutes | (1) | (1) |
| (5) Boron plus polyethylene | .192 | 38 |
| (6) No. 5 after retorting at 250° F. for 40 minutes | .192 | 38 |
| (7) Titania coatings plus polyethylene after retorting at 250° F. for 40 minutes | .24 | 15 |

[1] Coating removed.

Line 1 in Table I gives the lubricity and film strength indicies for a raw glass surface. The additional lines give contrasting lubricity and film strength readings for various coatings and demonstrate the improvements obtained with the new boron coatings.

Line 2 shows the improvements in the lubricity and the film strength obtained with the new boron coating applied alone. It indicates an improvement in lubricity which reduces the friction to less than one half the value for raw glass and it shows a five times improvement in the film strength. This comprises a significant improvement for the boron coating alone which is of value in certain instances where no second coating is applied and it is also of value in protecting the glass articles during handling operations between the point where the boron coating is applied and the area where the secondary coatings are applied by reducing scratching and fracture during this period of the glassware handling.

As already indicated, the present coating is of particular value as an undercoating for a secondary protective coating such as polyethylene or other organic coating. Lines 3 and 4 of Table I show the comparative lubricity and film strength indices for the glass surface coated with polyethylene alone and after a typical retorting operation typical of those done with food packages. Line 5 shows the substantial improvement obtained in lubricity and in film strength for a combined coating consisting of the boron undercoating as described above and with an outer coating of sprayed on emulsified polyethylene as for example a polyethylene emulsified as described in United States patent application Ser. No. 439,073 filed Mar. 11, 1965, now Pat. No. 3,487,035, and owned by the assignee of the present invention or a coating as described in U.S. Pat. No. 2,995,533. This combination of line 5 is seen to reduce the friction to less than one quarter of the index for raw glass and to provide an almost forty times increase in film strength.

It is particularly important that this improvement be obtained not only initially but also that it be retained in glass container packaging operations after the filled package has been subjected to retorting or heating operation. Line 6 shows that there is no loss in the lubricity and film strength index values after such a typical retorting operation for food packaging lines.

Lines 6 and 7 are included to give a comparison of the lubricity and film strength index readings as obtained with the new coatings as compared with a coating consisting of the titania type undercoating with a polyethylene coating where the titania may be applied, for example, in accordance wih the above noted Pat. No. 2,478,817 with a secondary coating of a similar polyethylene. The new boron type coatings as combined with a polyethylene outer coating retain a film strength after retorting which is significantly greater than that exhibited by a titania and polyethylene coating after retorting as shown in line 7 of Table I.

Table II indicates corresponding index readings for additional embodiments of the water base boron coating in accordance with the present invention showing differing proportions of the boric acid and aluminum sulphate.

TABLE II

| | Boric acid [1] | Aluminum sulphate [1] | Lubricity index | Film strength index |
|---|---|---|---|---|
| 1 | 0 | 5 | .291 | 15 |
| 2 | 2.5 | 5 | .202 | 20 |
| 3 | 3 | 7 | .213 | 15 |
| 4 | 4 | 6 | .190 | 24+ |
| 5 | 5 | 0 | .179 | 3 |
| 6 | 5 | 5 | .192 | 38+ |
| 7 | 6 | 4 | .209 | 21 |
| 8 | 10 | 5 | .254 | 24+ |

[1] Grams per 100 cc. of water.

Table II shows a improvement in the lubricity index where boric acid is used alone in the formulation in line 5 however there is very little increase in the film strength in this case. Where the aluminum sulphate is used alone as in line 1 there is a significant improvement in the film strength index but a lesser improvement in the lubricity index. Line 6 is the preferred formulation with equal amounts of boric acid and aluminum sulphate as discussed above and significant improvements in both the lubricity and film srtength indicies are obtained. In the various other proportions show, significant but less desirable improvements are shown in both the lubricity and film strength indices. Improvements are seen to result from the addition of a fractional portion of a gram of boric acid to upper limits in the neighborhood of 10 grams which is about or slightly above the limit of solubility for boric acid, thus, does not contribute significantly to the desirable effects.

The preferred amount of aluminum sulphate appears to be in the neighborhood of 5 grams as shown with good results still being obtained from the use of lesser amounts but with little significant improvement being obtained by greater amounts above about 7 grams.

As indicated, significant improvements in both the lubricity and the film strength are demonstrated in the proportions of the formulations of line 6 of Table II. It is believed to relate to the resulting formation of the highly polar $BAlO_3$. Boron oxide is believed to exist as planar $BO_3^{-3}$ groups with the boron at the center of a triangle composed of three oxygen atoms. These triangles can then share corners or edges to form rings, chains or two dimensional sheets. The role of the boron is primarily to hold together three oxygen atoms. Owing to its small size, its charge would be expected to be shielded by three oxygen ions. This film therefore would not produce highly charged dipoles. In order to produce dipoles capable of bonding to the glass surface and to an external coating, the repeating planar structure of $BO_3^{-3}$ triangles must be disrupted. Like boron, aluminum also has a valence of +3. It is a larger ion and its coordination number with oxygen, i.e. the number of oxygen spheres that will fit around it, is listed as from 4 to 6. It was found that the optimum properties of coatings were in the range of boric acid from 4.5–5 grams and aluminum sulphate from 5–5.5 grams. A coordination number of 5 for $Al^{+3}$ ions would require a mixture in the ratio of 4.8 grams of boric acid and 5.2 grams aluminum sulphate. With a coordination number of 5, the structure of the surface film takes on the third dimension. As the composition is removed from the ratio 1:5 :: $Al^{+3}$ : $B^{+3}$ the coating deteriorates. This ratio therefore appears to be most conductive to the formation of dipoles.

TABLE III [1]

| | Boric acid [2] | Source metal ions | Lubricity index |
|---|---|---|---|
| 1 | 1 | 10ZnCl | .166 |
| 2 | 5 | 15Zn(NO$_3$)$_2$ | .193 |
| 3 | 5 | 5ZnSO$_4$ | .213 |
| 4 | 5 | 10ZnSO$_4$ | .310 |
| 5 | 5 | 5MgSO$_4$ | .254 |

[1] Film strength index for all the below formulations is 24 or more.
[2] Grams per 100 cc. of water.

Table III shows additional embodiments of the formulation using differing metal compounds to provide zinc or magnesium ions in the resulting coating. These formulations are seen to provide a somewhat lower film strength index with a generally satisfactory lubricity index as shown. These added formulations, thus, are generally satisfactory, however, they do not provide as high a combination of high lubricity and film strength as results from the formulations of Table II and particularly the formulation of line 5 of Table II.

The formulation of line 1 in Table III is seen to provide a particularly good lubricity index and an acceptable film strength resulting from the combination of boric acid and zinc chloride in the combination as set forth in line 1.

It will be seen that an improved water base protective coating for glassware particularly suited for spray application has been described which exhibits significantly improved protective properties when combined with an organic secondary coating as when combined, for example, with an outer polyethylene coating. Improved characteristics such as lubricity and film strength are provided by the coating combined with good clarity, color, and luster characteristics. The boron coating as a water base formulation is easily handled and applied by regular air sprays or atomizers mounted adjacent to conventional glassware handling conveyors. The protective coatings therefore may be applied with little or no change in the normal glassware handling steps and without significant changes in the normal procedure of moving the glassware from the forming apparatus through the regular annealing lehrs and other regular glassware treating processes and apparatus.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described our invention, we claim:

1. A method of increasing the scratch resistance of a glass surface comprising coating said surface while at an elevated temperature between the strain temperature and the deforming temperature of the glass with a spray of an aqueous solution consisting essentially of from about 1 to about 10 grams of boric acid and from about 1 to about 15 grams of a metal compound selected from the group consisting of aluminum sulfate, zinc chloride, zinc nitrate, zinc sulfate, and magnesium sulfate, said boric acid and metal compound being dissolved in 100 cubic centimeters of water.

2. A method as claimed in claim 1 in which the boric acid is present to the extent of from about 4.5 to about 5.0 grams and the metal compound is present to the extent of from about 5.0 to about 5.5 grams of aluminum sulfate per 100 cubic centimeters of water.

3. The method as claimed in claim 1 in which the glass surface is at a temperature of about 1050° F.

4. The method as claimed in claim 1 which comprises the further step of applying an outer coating of emulsified polyethylene.

5. A coated glass article having improved surface lubricity and scratch resistance, said coated article being formed by spraying the surface of said article while it is at an elevated temperature between the stain temperature and the deforming temperature of the glass with a spray of an aqueous solution consisting essentially of from about 1 to about 10 grams of boric acid and from about 1 to about 15 grams of a metal compound selected from the group consisting of aluminum sulfate, zinc chloride, zinc nitrate, zinc sulfate, and magnesium sulfate, said boric acid and metal compound being dissolved in 100 cubic centimeters of water.

6. A glass article as claimed in claim 5 in which said metal compound is aluminum sulfate.

7. A glass article as claimed in claim 5 which further comprises a polyethylene coating over said surface film.

References Cited

UNITED STATES PATENTS

| 748,849 | 1/1904 | Duncan | 117—124 |
|---|---|---|---|
| 2,383,470 | 8/1945 | Morgan | 117—54 X |
| 2,478,817 | 8/1949 | Gaiser | 117—54 X |
| 2,995,533 | 8/1961 | Parmer et al. | 117—127 X |
| 3,002,857 | 10/1961 | Stalego | 117—169 X |
| 3,032,439 | 5/1962 | Muller et al. | 117—72 X |
| 3,048,466 | 8/1962 | Tiede | 117—124 X |
| 3,161,534 | 12/1964 | Dettre | 117—124 X |
| 2,709,644 | 5/1955 | Gustin | 117—54 X |
| 3,323,889 | 6/1967 | Carl et al. | 117—54 X |
| 3,368,915 | 2/1968 | Carl et al. | 117—54 X |

FOREIGN PATENTS 607,443  10/1960  Canada.

WILLIAM D. MARTIN, Primary Examiner

M. R. P. PERRONE, JR., Assistant Examiner

U.S. Cl. X.R.

106—287; 117—88, 124, 169